United States Patent
Luo (10) Patent No.: US 8,117,427 B2
(45) Date of Patent: Feb. 14, 2012

(54) MOTHERBOARD, STORAGE DEVICE AND CONTROLLER THEREOF, AND BOOTING METHOD

(75) Inventor: You-Cheng Luo, Taichung County (TW)

(73) Assignee: Phison Electronics Corp., Miaoli (TW)

( * ) Notice: Subject to any disclaimer, the term of this patent is extended or adjusted under 35 U.S.C. 154(b) by 437 days.

(21) Appl. No.: 12/372,123

(22) Filed: Feb. 17, 2009

(65) Prior Publication Data

US 2010/0146255 A1      Jun. 10, 2010

(30) Foreign Application Priority Data

Dec. 9, 2008   (TW) ................................ 97147874 A (51) Int. Cl.
*G06F 15/00* (2006.01)
(52) U.S. Cl. .............................................. 713/1; 713/2
(58) Field of Classification Search ................... 713/1, 2
See application file for complete search history.

(56) References Cited

U.S. PATENT DOCUMENTS

| 7,234,052 | B2 * | 6/2007 | Lee et al. ......................... 713/2 |
| 7,555,678 | B2 * | 6/2009 | Lai et al. ........................ 714/36 |
| 2004/0193864 | A1 * | 9/2004 | Tsai et al. ......................... 713/1 |
| 2005/0055478 | A1 * | 3/2005 | Johns et al. ...................... 710/22 |
| 2010/0115256 | A1 * | 5/2010 | Challener et al. ................. 713/2 |
| 2010/0169558 | A1 * | 7/2010 | Honda et al. .................. 711/103 |

* cited by examiner

*Primary Examiner* — Kim Huynh
*Assistant Examiner* — Zahid Choudhury
(74) *Attorney, Agent, or Firm* — J.C. Patents (57) ABSTRACT

A motherboard, a storage device and a controller thereof and a booting method are provided. In the present invention, when powered on, an unfetch signal is transmitted to a central processor unit (CPU) by a controller such that an operation of the CPU is suspended. Next, a system firmware in the storage device is loaded by the controller. After the system firmware is loaded, a fetch-done signal is transmitted to the CPU by the controller such that the CPU starts executing a booting procedure.

19 Claims, 6 Drawing Sheets

MOTHERBOARD, STORAGE DEVICE AND CONTROLLER THEREOF, AND BOOTING METHOD

CROSS-REFERENCE TO RELATED APPLICATION

This application claims the priority benefit of Taiwan application Ser. No. 97147874, filed Dec. 9, 2008. The entirety of the above-mentioned patent application is hereby incorporated by reference herein and made a part of this specification.

BACKGROUND OF THE INVENTION

1. Field of the Invention

The present invention relates generally to a computer system, and more particularly, to a motherboard with a controller, a storage device with a system firmware, and a booting method.

2. Description of Related Art

During booting of a personal computer (PC), a basic input/output system (BIOS) is generally used to initialize hardware, test hardware function and boot an operating system. The BIOS is usually stored in a memory that can retain stored information even when not powered. This memory with a booting program is typically referred to as a system firmware read only memory (ROM). When the PC system is powered on or reset, an address of a first instruction to be executed by a central processing unit (CPU) located in the system firmware ROM such that the booting program is executed from this address.

Current system firmware ROM is fixedly disposed in a motherboard system of the PC and is connected to a south bridge chip of a control chipset via a low pin count bus or a serial peripheral interface (SPI) bus. Because the ROM is fixedly disposed in the motherboard, it may be rather difficult to repair the ROM when the ROM has a breakdown.

SUMMARY OF THE INVENTION

Accordingly, the present invention is directed to a storage device which is divided into two regions for storing system firmware and system data, respectively, and which includes a controller for accessing the system firmware.

The present invention is also directed to a motherboard which reads a storage device having a system firmware via a controller.

The present invention is further directed to a booting method for solving a delay problem in reading the system firmware by a CPU.

Specifically, the present invention provides a controller including a micro control unit, a buffer, an interface control module and a peripheral control unit. The micro control unit is coupled to a CPU of the motherboard, when power is supplied to the controller, the micro control unit transmits an unfetch signal to the CPU such that the CPU suspends a booting procedure. The buffer is coupled to the micro control unit. In addition, the peripheral control unit is coupled to the micro control unit, the buffer and a storage module. The peripheral control unit is adapted to load a system firmware in the storage module into the buffer. The interface control module is coupled to the micro control unit, the buffer and the CPU. The interface control module is adapted to read the system firmware in the buffer. After the micro control unit loads the system firmware into the buffer via the peripheral control unit, the micro control unit transmits a fetch-done signal to the CPU such that the CPU reads the system firmware in the buffer via the interface control module to execute the booting procedure.

The present invention additionally provides a motherboard including a CPU, a controller and a storage module. The controller is coupled to the CPU. The storage module is coupled to the controller such that the CPU communicates with the storage module via the controller. When power is supplied to the motherboard, the controller transmits an unfetch signal to the CPU such that the CPU suspends a booting procedure. After the system firmware is loaded by the controller, the controller transmits a fetch-done signal to the CPU such that the CPU reads the system firmware via the controller to execute the booting procedure.

The present invention further provides a storage device which includes a storage module having a system firmware and a controller. The controller is coupled to a CPU and the storage module. When power is supplied to the storage device, the controller transmits an unfetch signal to the CPU such that the CPU suspends a booting procedure. After the system firmware is loaded by the controller, the controller transmits a fetch-done signal to the CPU such that the CPU reads the system firmware via the controller to execute the booting procedure.

According to one exemplary embodiment of the present invention, the controller includes the micro control unit, the buffer, the interface control module and the peripheral control unit. The micro control unit is coupled to the CPU of the motherboard for transmitting the unfetch signal or fetch-done signal to the CPU such that the CPU suspends or starts executing the booting procedure. The buffer is coupled to the micro control unit. The peripheral control unit is coupled to the micro control unit, the buffer and the storage module. The peripheral control unit is adapted to load the system firmware in the storage module into the buffer. The interface control module is coupled to the micro control unit, the buffer and the CPU. The interface control module is adapted to read the system firmware in the buffer.

According to one exemplary embodiment of the present invention, the micro control unit further includes a control pin for transmitting the unfetch signal or the fetch-done signal. The control pin and a reset pin of the CPU are coupled to an input end of a logic AND gate, and an output end of the logic AND gate is coupled to the CPU.

According to one exemplary embodiment of the present invention, the interface control module includes a firmware interface control unit which includes a firmware address register and a firmware data register. The firmware address register is used for temporarily storing an address carried in a read request transmitted from the CPU such that the firmware interface control unit reads the system firmware from the buffer according to the address. The firmware data register is used for temporarily storing the system firmware which is read according to the address.

According to one exemplary embodiment of the present invention, the interface control module further includes a storage interface control unit coupled to the micro control unit and the CPU. After the CPU initializes the storage interface control unit by executing the system firmware, the CPU accesses the storage module via the storage interface control unit.

According to one exemplary embodiment of the present invention, the firmware interface control unit may be coupled to the CPU via a system firmware transmission interface. The storage interface control unit may be coupled to the CPU via a system data transmission interface. The system firmware transmission interface is one of a serial peripheral interface (SPI) bus, an industry standard architecture (ISA) bus, and a low pin count (LPC) bus. The system data transmission interface is one of a peripheral controller interface (PCI) bus, a PCI Express bus, a parallel advanced technology attachment (PATA) bus, and a serial advanced technology attachment (SATA) bus.

According to one exemplary embodiment of the present invention, the system firmware includes a boot block code and a runtime block code. The CPU reads the boot block code via the firmware interface control unit to initialize at least the storage interface control unit, a control chipset and a main memory of the motherboard. The CPU reads the runtime block code via the storage interface control unit to continue the booting procedure.

In another aspect, the present invention provides a booting method suitable for a computer system. The computer system includes a CPU, a controller and a storage module. The controller is coupled between the CPU and the storage module. In the booting method, when power is supplied to the computer system, an unfetch signal is first transmitted to the CPU by the controller such that the CPU suspends a booting procedure. Next, a system firmware in the storage module is loaded by the controller. After the system firmware is loaded, a fetch-done signal is transmitted to the CPU by the controller such that the CPU starts executing the booting procedure.

According to one exemplary embodiment of the present invention, the system firmware includes a plurality of code segments. In the booting method, loading the system firmware in the storage module by the controller includes loading the system firmware into a buffer in the controller and loading a first code segment of the plurality of code segments into the buffer according to a first address carried in a first read request transmitted from the CPU.

After the fetch-done signal is transmitted to the CPU, the method further includes receiving a second read request from the CPU via the controller to determine whether a second address carried in a second read request is within the first code segment. When the second address is not within the first code segment, a second code segment of the multiple code segments corresponding to the second address is loaded into the buffer via the controller.

According to one exemplary embodiment of the present invention, the booting method further includes performing a logic AND operation according to the fetch-done signal and a reset signal or the unfetch signal and a reset signal to control whether the central process unit operates.

According to one exemplary embodiment of the present invention, after transmitting the fetch-done signal to the CPU, the method further includes reading the system firmware in the buffer via the firmware interface control unit of the controller to execute the booting procedure so as to initialize at least the storage interface control unit of the controller, the control chipset and the main memory of the computer system.

In view of the foregoing, in the present invention, the system firmware and system data are stored in a same storage module, thereby saving the space of the motherboard that is originally used to accommodate the system firmware ROM as well as reducing the cost of additionally manufacturing the system firmware ROM. In addition, another aspect of the present invention provides a controller such that the CPU can read the system firmware in the storage module via the controller and the problem of reading delay is thereby overcome.

In order to make the aforementioned and other features and advantages of the present invention more comprehensible, exemplary embodiments accompanied with figures are described in detail below.

DESCRIPTION OF THE EXEMPLARY EMBODIMENTS

Figure 1:
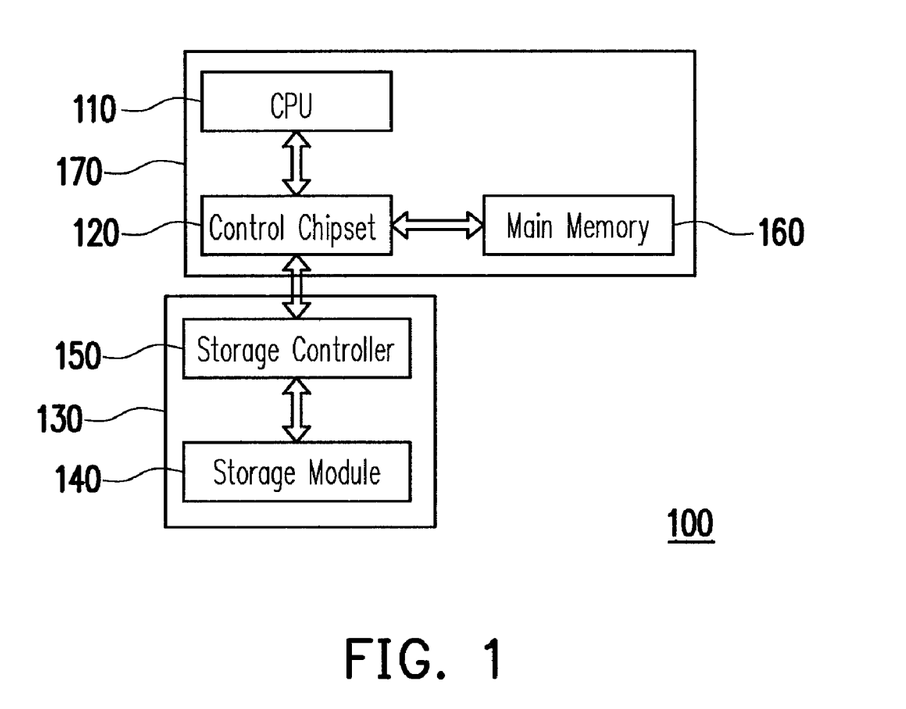
FIG. 1 is a block diagram of a computer system according to one exemplary embodiment of the present invention.

FIG. 1 is a block diagram of a computer system according to one exemplary embodiment of the present invention. Referring to FIG. 1, the computer system 100 includes a central processing unit (CPU) 110, a control chipset 120, a storage device 130, and a main memory 160. The CPU 110, control chipset 120 and main memory 160 are disposed in a motherboard 170. The control chipset 120 is coupled to the CPU 110 and the main memory 160. In the present exemplary embodiment, the main memory 160 is, for example, a dynamic random access memory (DRAM).

The CPU 110 is used to execute instructions of the computer system to thereby control operation of the computer system 100.

The control chipset 120 is adapted for coupling the CPU 110 to other components of the computer system 100, such as, the storage device 130 and the main memory 160. In the present exemplary embodiment, a single chip with north bridge chip and south bridge chip functions integrated therein is implemented as the control chipset 120. In another exemplary embodiment, the control chipset 120 may also includes separate north bridge chip and south bridge chip.

The storage device 130 includes a storage module 140 and a controller 150. In the present exemplary embodiment, a non-volatile memory (NVM) is implemented as the storage module 140 to store both a system firmware and system data. An example of the storage module 140 is discussed below.

Figure 2:
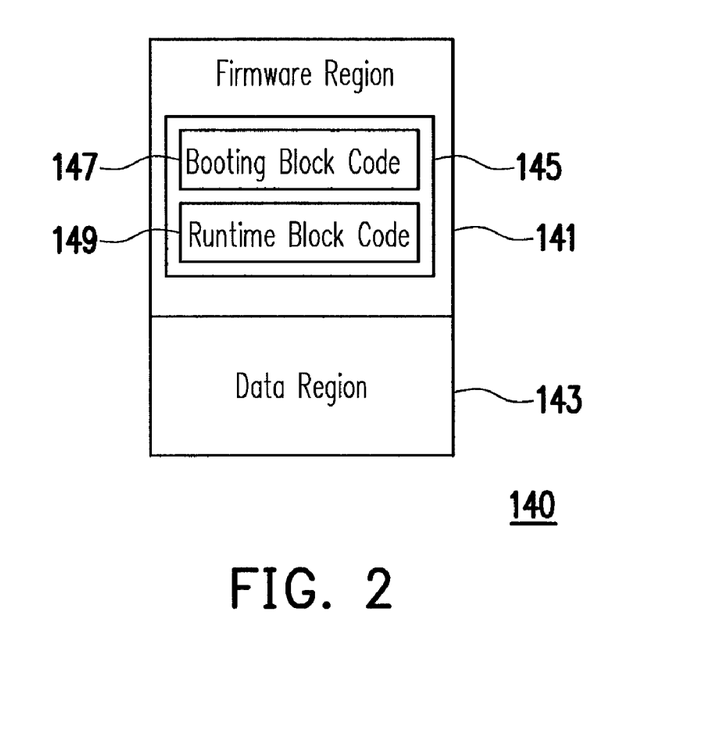
FIG. 2 is a block diagram of a storage module according to one exemplary embodiment of the present invention.

FIG. 2 is a block diagram of a storage module according to one exemplary embodiment of the present invention. Referring to FIG. 2, the storage module 140 includes a firmware region 141 and a data region 143. The firmware region 141 is used to store a system firmware 145 such as a basic input/output system (BIOS) or a unified extensible firmware interface (UEFI). The data region 143 is adapted for storing system data such as an operating system, a driver program, a file system or the like.

The system firmware 145 may further be divided into two blocks—boot block code 147 and runtime block code 149. The boot block code 147 is adapted for setting initial values upon booting of the computer system 100 and setting the initialization of hardware. The runtime block code 149 is used for the operation of the computer system 100 and controlling the performance and other functions of the hardware.

In general, the boot block code 147 can be executed without decompression, while the runtime block code 149 needs to be decompressed before execution. Therefore, the boot block code 147 at least includes the function of initializing the control chipset 120 and the main memory 160 such that the runtime block code 149 is directly transmitted to the main memory 160 and decompressed to speed up the execution of the system firmware 145 after the execution of the boot block code 147.

Referring again to FIG. 1, the controller 150 is coupled between the control chipset 120 and the storage module 140 such that the CPU 110 can read the system firmware 145 of the storage module 140 via the controller 150. A further example of the controller 150 is discussed below to explain internal elements of the controller 150.

Figure 3A:
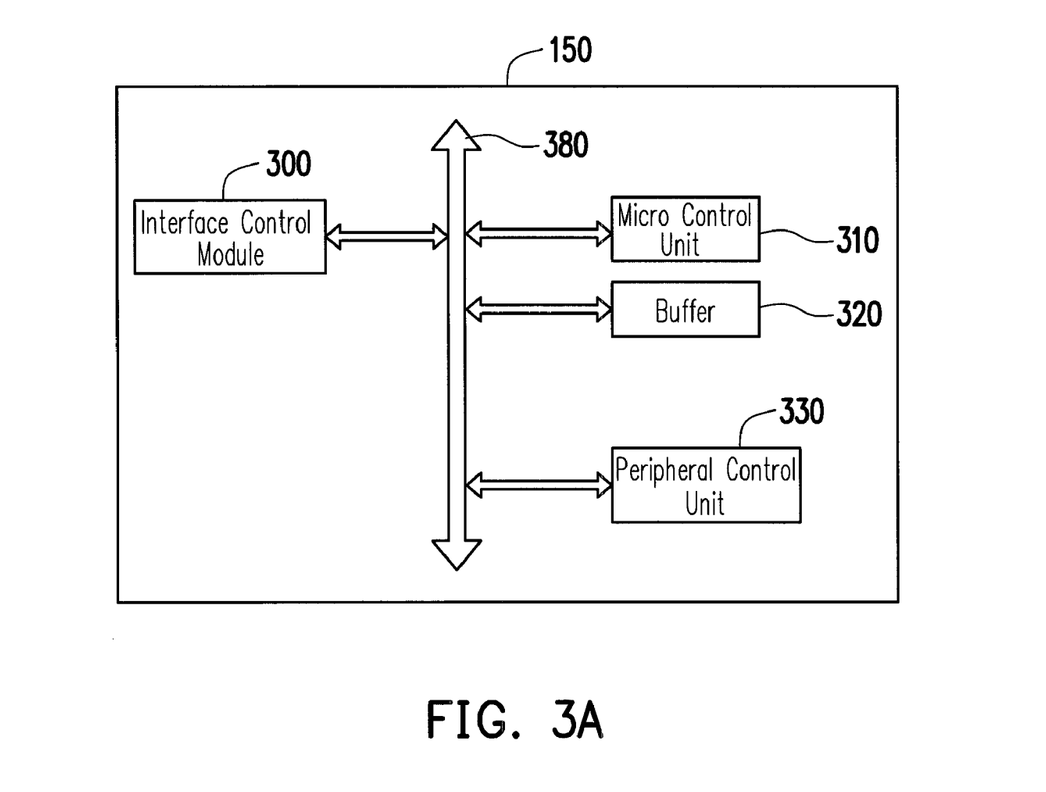
FIG. 3A is a block diagram of a controller according to one exemplary embodiment of the present invention.

FIG. 3A is a block diagram of the controller according to one exemplary embodiment of the present invention. Referring to FIGS. 1 and 3A, the controller 150 includes an interface control module 300, a micro control unit 310, a buffer 320, and a peripheral control unit 330.

The micro control unit 310 is coupled to the CPU 110 of the motherboard 170 for controlling the interface control module 300, the buffer 320 and the peripheral control unit 330, and data exchange via an internal data bus 380.

The buffer 320 is coupled to the micro control unit 310 and provides the interface control module 300 with a space for temporary storage of exchanged data when data is being moved. In addition, in the present exemplary embodiment, the buffer 320 may further be divided into two parts, one of which temporarily stores the system firmware moved by the micro control unit 310, and the other of which temporarily stores the system data moved by the micro control unit 310.

The peripheral control unit 330 is coupled to the micro control unit 310, the buffer 320 and the storage module 140 such that the micro control unit 310 can load the system firmware of the storage module 140 into the buffer 320 via the peripheral control unit 330. Here, the peripheral control unit 330 broadly means an interface control unit that supports any memory card or an interface control unit that supports directly accessing a flash memory.

The interface control module 300 is coupled to the micro control unit 310, the buffer 320 and the CPU 110. The interface control module 300 is adapted for reading the system firmware in the buffer 320 to execute the booting operation.

The controller 150 will be described below in conjunction with a storage device having the controller 150.

Figure 3B:
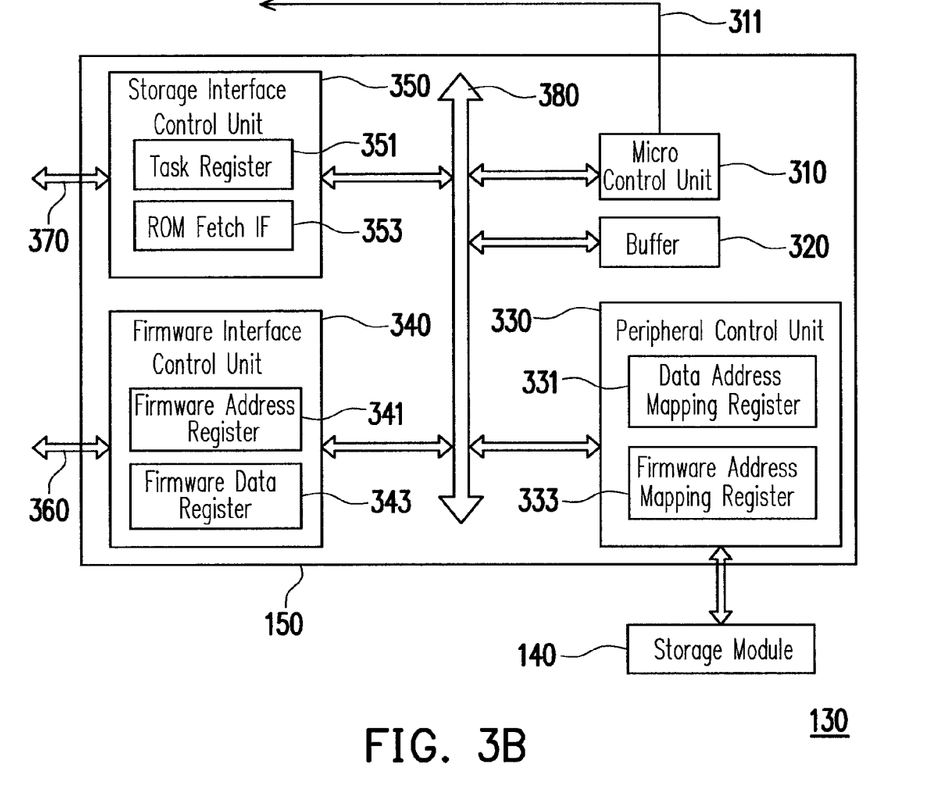
FIG. 3B is a block diagram of a storage device having a controller according to one exemplary embodiment of the present invention.

FIG. 3B is a block diagram of a storage device including a controller according to one exemplary embodiment of the present invention. Referring to FIGS. 1 and 3B, in the present exemplary embodiment, the interface control module 300 includes a firmware interface control unit 340 and a storage interface control unit 350. However, in another exemplary embodiment, the interface control module 300 may also include a firmware interface control unit 340 alone.

In addition, in the present exemplary embodiment, the peripheral control unit 330 further includes a data address mapping register 331 and a firmware address mapping register 333 for recording the mapping relationships between a logic address and a physical address of the system data and the system firmware, respectively.

The firmware interface control unit 340 is coupled to the micro control unit 310 and the buffer 320, and is coupled to the CPU 110 via the control chipset 120. The firmware interface control unit 340 includes a firmware address register 341 and a firmware data register 343. The firmware address register 341 is adapted for temporarily storing an address carried in a read request transmitted from the CPU 110 such that the firmware interface control unit 340 reads the system firmware in the buffer 320 according to this address. The firmware data register 343 is adapted for temporarily storing the system firmware which is read according to this address.

In addition, the firmware interface control unit 340 may further be coupled to the CPU 110 via a system firmware transmission interface 360 and the control chipset 120. In other words, the firmware interface control unit 340 may be adapted for decoding the read request transmitted via the system firmware transmission interface 360 and access the system firmware according to the address carried in the read request. Here, the system firmware transmission interface 360 is, for example, one of a serial peripheral interface (SPI) bus, an industry standard architecture (ISA) bus and a low pin count (LPC) bus.

The storage interface control unit 350 is coupled to the micro control unit 310 and the buffer 320, and is coupled to the CPU 110 via the control chipset 120. After the CPU 110 reads the system firmware through the firmware interface control unit 340 to thereby initialize the storage interface control unit 350, the storage module 140 can be accessed via the storage interface control unit 350.

The storage interface control unit 350 further includes a task register 351 and a ROM fetch interface (ROM fetch IF) 353. The task register 351 is adapted for providing a set of interfaces through which software of the computer system 100 can be executed to perform write, read and control function in the data region of the storage module 140. Similarly, the ROM fetch IF 353 is adapted for providing a set of hardware configuration control interfaces through which software of the computer system 100 can be executed to write or read the system firmware stored in the storage module 140

In addition, the storage interface control unit 350 may also be coupled to the CPU 110 via a system data transmission interface 370 and the control chipset 120. The system data transmission interface 370 is, for example, one of a peripheral controller interface (PCI) bus, a PCI Express bus, a parallel advanced technology attachment (PATA) bus and a serial advanced technology attachment (SATA) bus.

More specifically, when power is supplied to the computer system 100, the storage device 130 is supplied with power at the same time. At this time, the micro control unit 310 transmits an unfetch signal to the CPU 110 such that the CPU 110 suspends a booting procedure. After the micro control unit 310 loads the system firmware into the buffer 320 via the peripheral control unit 330, the micro control unit 310 transmits a fetch-done signal to the CPU 110 such that the CPU 110 reads the system firmware in the buffer 320 via the firmware interface control unit 340 to execute the booting procedure.

Here, the micro control unit 310 may include a control pin 311 for transmitting the unfetch signal or fetch-done signal. An example is discussed to explain how and when to control the suspension of the CPU 110.

Figure 4:
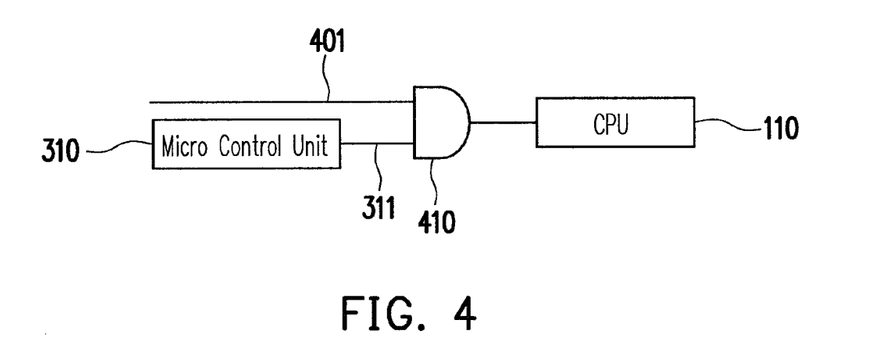
FIG. 4 is a partial block diagram of a computer system according to one exemplary embodiment of the present invention.

FIG. 4 is a partial block diagram of a computer system according to one exemplary embodiment of the present invention. Referring to FIG. 4, a reset pin 401 is originally adapted for controlling the reset of the CPU 110. In FIG. 4, a control pin 311 of the micro control unit 310 and the reset pin 401 are coupled to an input end of a logic AND gate 410, and an output end of the logic AND gate 410 is coupled to the CPU 110. However, it should be understood the present invention is not limited to the particular exemplary embodiments described herein. Rather, in another exemplary embodiment of the present invention, the control pin 311 also can be coupled to the input end of the logic AND gate 410 via the system firmware transmission interface 360 or the system data transmission interface 370 (not shown in the drawings). As such, assuming the reset signal is "1" and the unfetch signal is "0", after the logic AND operation, the logic AND gate 410 outputs a signal "0" to the CPU 110 such that the CPU 110 is suspended. On the contrary, assuming the reset signal is "1" and the fetch-done signal is "1", after the logic AND operation, the logic AND gate 410 outputs a signal "1" to the CPU 110 to start operation of the CPU 110. However, these examples are described for the purpose of illustration only and should not be used to limit the present invention.

The present invention also provides a corresponding booting method for the computer system 100 described above. An example of the booting method is discussed blow in conjunction with the various elements of the computer system 100.

Figure 5:
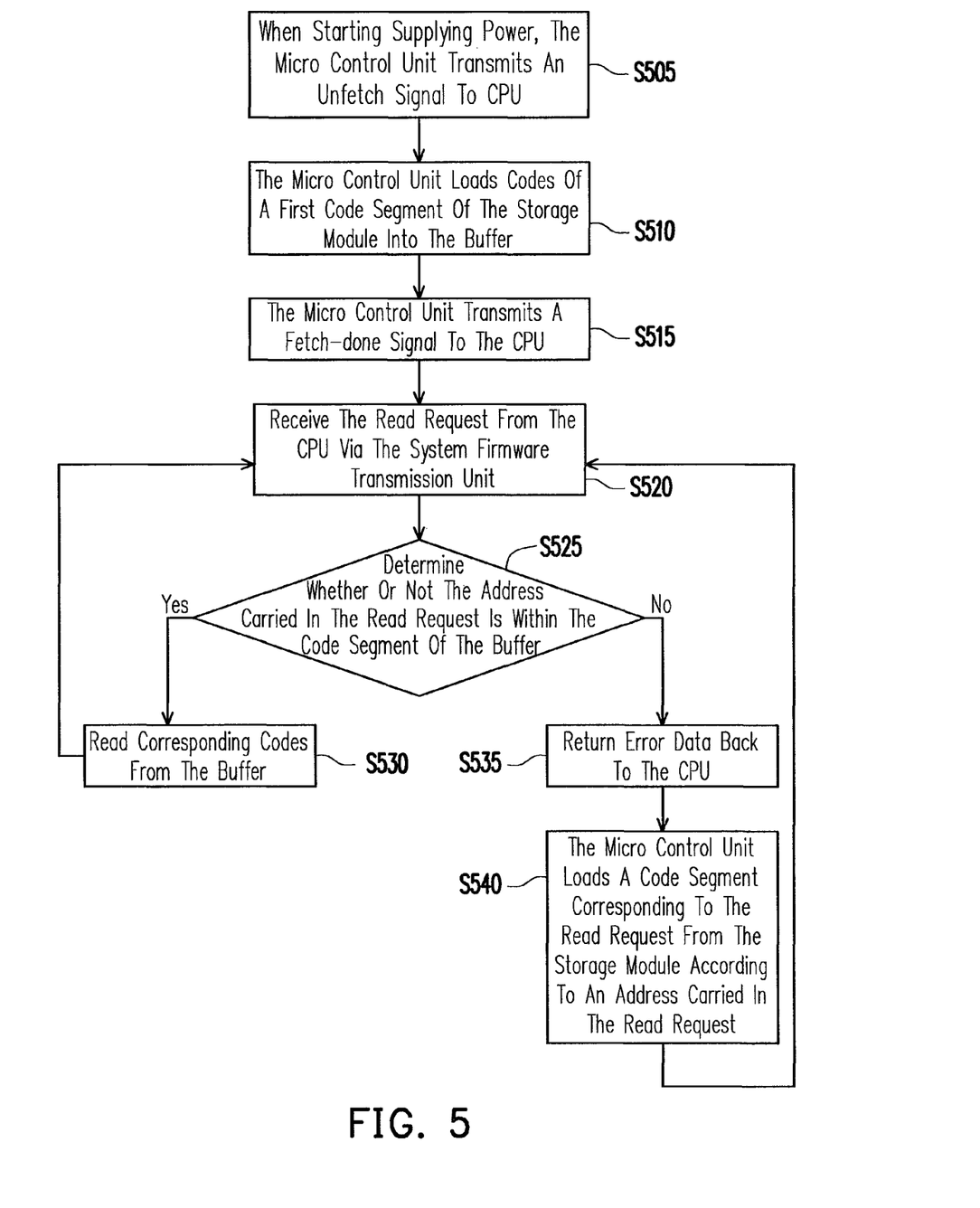
FIG. 5 is a flow chart of a booting method according to one exemplary embodiment of the present invention.

FIG. 5 is a flow chart of a booting method according to one exemplary embodiment of the present invention. Referring to FIGS. 1, 2, 3B and 5, at step S505, when the computer system 100 is supplied with power, the micro control unit 310 first transmits an unfetch signal to the CPU 110 such that the CPU 110 suspends a booting procedure. For example, the CPU 110 suspends the operation based on a logic AND operation performed according to the unfetch signal and the reset signal.

Then, at step S510, a first code segment of the system firmware 145 in the storage module 140 is loaded into the buffer 320 by the micro control unit 310. The micro control unit 310 first sets the firmware address mapping register 333 in the peripheral control unit 330 and subsequently moves the system firmware 145 to the buffer 320. This is because directly reading the system firmware 145 in the storage module 140 via the system firmware transmission interface 360 may cause a problem of reading delay. Therefore, the system firmware 145 is first moved to the buffer 320.

More specifically, the system firmware 145 may be divided into a plurality of code segments according to the size of the buffer 320. When powered on, the micro control unit 310 in the storage device 130 starts reading codes of the first code segment from the storage module 140 and loading them into the buffer 320 in the storage device. The first code segment is a segment corresponding to the address carried in the first read request from the CPU when powered on. Here, it is assumed that the size of one code segment is 10000h and the address scope of the first code segment is F0000h-FFFF0h.

Afterwards, after the first code segment has been completely loaded into the buffer 320, at step S515, the micro control unit 310 transmits a fetch-done signal to the CPU 110 such that CPU 110 starts executing the booting procedure. In other words, after the codes of the first code segment are read into the buffer 320, the micro control unit 310 transmits the fetch-done signal via the control pin 311 such that the CPU 110 starts operation.

Next, at step S520, the storage device 130 receives, via the system firmware transmission interface 360, the read request transmitted from the CPU 110. When the CPU 110 sends out the read request and the storage device 130 receives the read request via the system firmware transmission interface 360, the firmware interface control unit 340 in the storage device 130 determines whether the address of the read request is within the address scope of the code segment temporarily stored in the buffer 320. If the address of the read request is within the address scope of the code segment of the buffer, the method proceeds to step S530. If no, the method proceeds to step S535.

In regard to the address scope F0000h-FFFF0h of the first code segment temporarily stored in the buffer 320, when the address of the read request is within F0000h-FFFF0h, the firmware interface control unit 340 reads relevant content from the buffer 320 at step S530. In other words, the boot block code 147 in the buffer 320 is read via the firmware interface control unit 340 to start the initialization operation. The boot block code 147 is required to include, for example, a minimum requirement as to the initialization of the storage interface control unit 350, the control chipset 120 and the main memory 160.

The firmware interface control unit 340 reads the code segment of the boot block code 147 preloaded into the buffer 320 according to the address in the read request, and stores a data corresponding the address into the firmware data register 343 of the firmware interface control unit 340 via the internal data bus 380. The firmware interface control unit 340 then returns the data stored in the firmware data register 343 back via the system firmware transmission interface 360.

The CPU 110 continuously reads the system firmware 145 via the system firmware transmission interface 360 to complete initialization of other hardware in the computer system 100.

On the other hand, when the address of the read request (e.g., E2000h) is not within F0000h-FFFF0h, the firmware interface control unit 340 may return an error data back to the CPU 110 via the system firmware transmission interface 360 at step S535.

Then, at step S540, the micro control unit 310 loads a code segment corresponding to the read request from the storage module 140 according to the address carried in the read request. For example, the micro control unit 310 loads the code segment at E0000h-EFFF0h from the storage module 140 into the buffer 320 according to the address E2000h in the read request of the CPU 110. Thereafter, the method returns to step S520.

It should be noted that, at step S535, when the CPU 110 receives the error data returned from the firmware interface control unit 340, the CPU 110 does not perform any process, which means for causing the micro control unit 310 to move a next code segment. Taking the BIOS code as an example, when it is desired to jump to the address of another segment to execute the another segment of codes during the program execution, an instruction of reading an initial address of the code segments and an instruction of a waiting time of segment movement can be added before a jump instruction.

Figure 6:
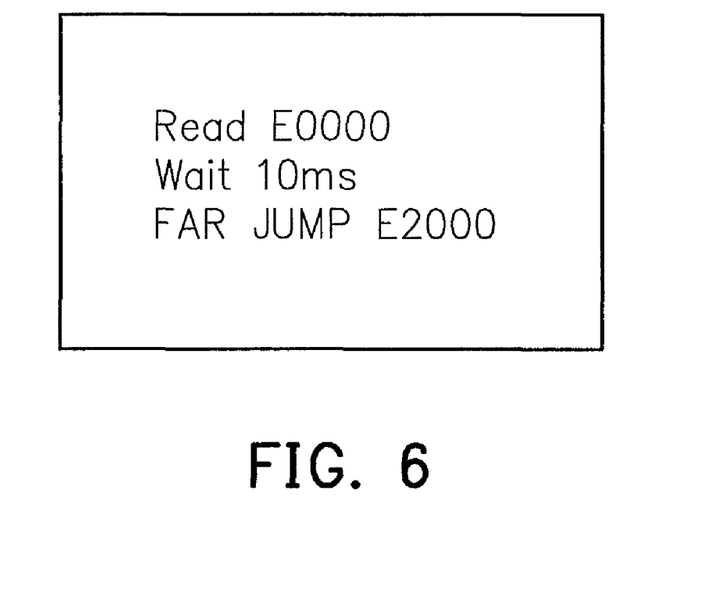
FIG. 6 is a view showing exemplary partial codes of a BIOS according to one exemplary embodiment of the present invention.

FIG. 6 is a view showing exemplary partial codes of a BIOS according to one exemplary embodiment of the present invention. Referring to FIG. 6, "FAR JUMP E2000" is an instruction of jumping from the original code to another code segment. "Read E0000" is an instruction of reading an initial address of the code segments. "Wait 10 ms" is an instruction of the waiting time of segment movement. Here, the waiting time for a segment movement is determined according to the time that the micro control unit 310 moves a code segment into the buffer 320.

Thereby, the initialization of the storage interface control unit 350, the control chipset 120 and the main memory 160 can be done by repeatedly performing step S505 to step S540. Afterwards, the CPU 110 can access data in the storage module 140 via the storage interface control unit 350. Another example is described below to explain various steps of accessing data.

Figure 7:
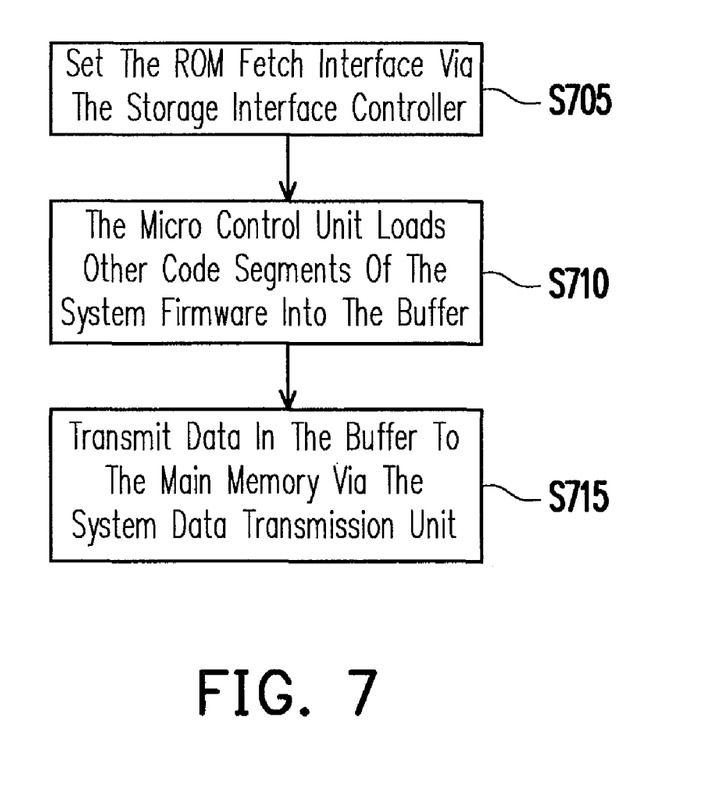
FIG. 7 is a flow chart of a method of accessing data according to one exemplary embodiment of the present invention.

FIG. 7 is a flow chart of a method of accessing data according to one exemplary embodiment of the present invention. Referring to FIGS. 1, 2, 3B and 7, the CPU 110 first sets the ROM fetch IF 353 in the storage interface control unit 350 at step S705. The ROM fetch IF 353 includes a target address which the system firmware 145 needs to be transmitted to the main memory 160, a ROM base address of the system firmware 145 to be read, and a move size of the system firmware 145 to be read. Then, the storage interface control unit 350 uses a direct memory access (DMA) enable signal to trigger the micro control unit 310.

Next, at step S710, the micro control unit 310 can load other code segments of the system firmware 145 in the storage module 140 into the buffer 320 according to the ROM fetch IF 353. Specifically, the micro control unit 310 sets the firmware address mapping register 333 in the peripheral control unit 330 according to an initial address which is set by the ROM base address, and then moves other code segments of the system firmware 145 in the storage module 140 into the buffer 320.

Afterwards, at step S715, the data in the buffer 320 is transmitted to the main memory 160 via the system data transmission interface 370. The storage interface control unit 350 converts the data in the buffer 320 into a transmission package on the system data transmission interface 370, which is to be transmitted to the address of the main memory 160 that is designated by the target address.

Step S710 to S715 are repeatedly performed until the entire system firmware 145 is loaded into the main memory 160. Therefore, the CPU 110 will no longer read the system firmware 145 via the firmware data transmission interface 360, but directly read from the main memory 160. As such, the time for reading the system firmware 145 via the firmware data transmission interface 360 can be eliminated.

It should be noted that under the architecture of the controller 150, the system firmware can also be written via the storage interface control unit 350.

For example, the CPU 110 sets the length of the system firmware to be written (e.g., stored in another storage device), an ROM base address of the system firmware to be written and a data port through which the system firmware is to be written via the ROM fetch IF 353 of the storage interface control unit 350, and then activates a write signal. This write signal triggers the micro control unit 310 such that the micro control unit 310 sets the firmware address mapping register 333 in the peripheral control unit 330 according to the initial address which is set by the ROM base address of the system firmware to be written. Next, the data to be written is moved into the buffer 320. The CPU 110 continuously writes the system firmware, and moves the system firmware into the buffer. When the size of the data in the buffer 320 is increased to the size of a code segment to be written, the peripheral control unit 330 writes one of the code segments of the system firmware in the buffer 320 into the storage module 140. This write process is repeatedly performed until the entire system firmware is written.

Figure 8:
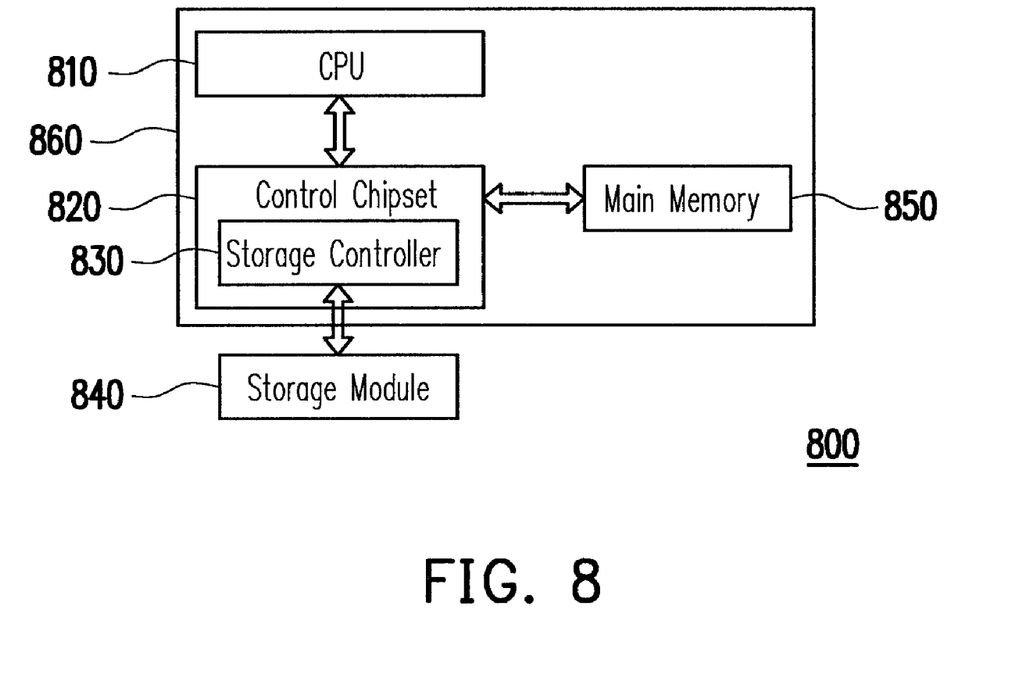
FIG. 8 is a block diagram of a computer system according to another exemplary embodiment of the present invention.

In the above exemplary embodiment, the controller 150 is integrated into the storage device 130. However, the controller 150 may also be integrated into the motherboard 170 in another exemplary embodiment as shown in FIG. 8. FIG. 8 is a block diagram of a computer system according to another exemplary embodiment of the present invention. The computer system 800 includes a CPU 810, a control chipset 820, a controller 830, a storage module 840, and a main memory 850. The CPU 810, the control chipset 820, the controller 830 and the main memory 850 are disposed in the motherboard 860. The control chipset 820 is coupled to the CPU 810, the storage module 840, and the main memory 850.

In this exemplary embodiment, the controller 830 is integrated into the control chipset 820. The function of the CPU 810, the control chipset 820, the controller 830, the storage module 840 and the main memory 850 is the same as or similar to the function of the CPU 110, the control chipset 120, the controller 150, the storage module 140 and the main memory 160, respectively, and therefore explanation thereof is not repeated herein.

It should be noted that, in addition to being integrated with the storage device or the motherboard, the controller may also be a single device. Therefore, the present invention should not be limited to the particular exemplary embodiments described herein.

In summary, in the above exemplary embodiments, the system firmware and system data are stored in a same storage module, thereby saving the space of the motherboard that is originally used to accommodate the system firmware ROM as well as eliminating the cost of additionally manufacturing the system firmware ROM. In addition, another aspect of the present invention provides a controller such that the CPU can read the system firmware in the storage module via the controller and the problem of the delay in reading is thereby overcome.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A controller comprising:
a micro control unit coupled to a central processing unit, wherein when power is supplied to the controller, the micro control unit transmits an unfetch signal to the central processing unit such that the central processing unit suspends a booting procedure;
a buffer coupled to the micro control unit;
a peripheral control unit coupled to the micro control unit and a storage module, the peripheral control unit is adapted to load a system firmware in the storage module into the buffer; and
an interface control module coupled to the micro control unit and the central processing unit, the interface control module is adapted to read the system firmware in the buffer, wherein the interface control module comprises a firmware interface control unit, the firmware interface control unit receiving a read request transmitted from the central processing unit via a system firmware transmission interface, the firmware interface control unit comprising:
a firmware address register for temporarily storing an address carried in the read request transmitted from the central processing unit such that the firmware interface control unit reads the system firmware from the buffer according to the address; and
a firmware data register for temporarily storing the system firmware which is read according to the address;
wherein when the central processing unit suspends the booting procedure, the micro control unit loads a first code segment of the system firmware in the storage module into the buffer, and after the first code segment is fully loaded into the buffer, the micro control unit transmits a fetch-done signal to the central processing unit such that the central processing unit starts executing the booting procedure;
after receiving the read request transmitted from the central processing unit, the firmware interface control unit determines whether the address of the read request is within an address scope of the first code segment temporarily stored in the buffer, wherein when the address of the read request is within the address scope of the first code segment temporarily stored in the buffer, the firmware interface control unit reads the codes of the first code segment of the system firmware in the buffer according to the address of the read request, stores the codes corresponding to the address into the firmware data register, and the firmware interface control unit returns the codes stored in the firmware data register back to the central processing unit via the system firmware transmission interface.

2. The controller according to claim 1, wherein the micro control unit comprises a control pin for transmitting the unfetch signal or the fetch-done signal, the control pin and a reset pin of the central processing unit are coupled to an input end of a logic AND gate, and an output end of the logic AND gate is coupled to the central processing unit.

3. The controller according to claim 1, wherein the firmware interface control unit further comprises the system firmware transmission interface which is one of a serial peripheral interface bus, an industry standard architecture bus, and a low pin count bus.

4. The controller according to claim 1, wherein the interface control module further comprises a storage interface control unit coupled to the micro control unit and the central processing unit, after the central processing unit initializes the storage interface control unit by executing the system firmware, the central processing unit accesses the storage module via the storage interface control unit.

5. The controller according to claim 4, wherein the storage interface control unit comprises:
  a task register for providing function of writing, reading and controlling with respect to the storage module; and
  a ROM fetch interface for writing or reading the system firmware stored in the storage module.

6. The controller according to claim 4, wherein the storage interface control unit further comprises a system data transmission interface which is one of a peripheral controller interface bus, a PCI Express bus, a parallel advanced technology attachment bus, and a serial advanced technology attachment bus.

7. A motherboard comprising:
  a central processing unit;
  a storage module having at least one system firmware; and
  a controller comprising:
  a micro control unit coupled to the central processing unit;
  a buffer coupled to the micro control unit;
  a peripheral control unit coupled to the micro control unit and the storage module, the peripheral control unit is adapted to load a system firmware in the storage module into the buffer; and
  an interface control module coupled to the micro control unit, the interface control module is adapted to read the system firmware in the buffer, the interface control module comprising a firmware interface control unit, the firmware interface control unit receiving a read request transmitted from the central processing unit via a system firmware transmission interface, the firmware interface control unit comprising:
  a firmware address register for temporarily storing an address carried in the read request transmitted from the central processing unit such that the firmware interface control unit reads the system firmware from the buffer according to the address; and
  a firmware data register for temporarily storing the system firmware which is read according to the address;
  wherein when power is supplied to the motherboard, the micro control unit transmits an unfetch signal to the central processing unit such that the central processing unit suspends a booting procedure, and the micro control unit loads a first code segment of the system firmware in the storage module into the buffer, and after the first code segment is fully loaded into the buffer, the micro control unit transmits a fetch-done signal to the central processing unit such that the central processing unit reads the system firmware via the controller to execute the booting procedure, and when the firmware interface control unit receives the read request transmitted from the central processing unit, the firmware interface control unit determines whether the address of the read request is within an address scope of the first code segment temporarily stored in the buffer, wherein when the address of the read request is within the address scope of the first code segment temporarily stored in the buffer, the firmware interface control unit reads the codes of the first code segment of the system firmware in the buffer according to the address of the read request, stores the codes corresponding to the address into the firmware data register, and the firmware interface control unit returns the codes stored in the firmware data register back to the central processing unit via the system firmware transmission interface.

8. A storage device comprising:
  a storage module having at least one system firmware; and
  a controller comprising:
  a micro control unit coupled to a central processing unit;
  a buffer coupled to the micro control unit;
  a peripheral control unit coupled to the micro control unit and the storage module, the peripheral control unit is adapted to load a system firmware in the storage module into the buffer; and
  an interface control module coupled to the micro control unit, the interface control module is adapted to read the system firmware in the buffer, the interface control module comprising a firmware interface control unit, the firmware interface control unit receiving a read request transmitted from the central processing unit via a system firmware transmission interface, the firmware interface control unit comprising:
  a firmware address register for temporarily storing an address carried in the read request transmitted from the central processing unit such that the firmware interface control unit reads the system firmware from the buffer according to the address; and
  a firmware data register for temporarily storing the system firmware which is read according to the address;
  wherein when power is supplied to the storage device, the micro control unit transmits an unfetch signal to the central processing unit such that the central processing unit suspends a booting procedure, and the micro control unit loads a first code segment of the system firmware in the storage module into the buffer, and after the first code segment is fully loaded into the buffer, the micro control unit transmits a fetch-done signal to the central processing unit such that the central processing unit reads the system firmware via the controller to execute the booting procedure, and when the firmware interface control unit receives the read request transmitted from the central processing unit, the firmware interface control unit determines whether the address of the read request is within an address scope of the first code segment temporarily stored in the buffer, wherein when the address of the read request is within the address scope of the first code segment temporarily stored in the buffer, the firmware interface control unit reads the codes of the first code segment of the system firmware in the buffer according to the address of the read request, stores the codes corresponding to the address into the firmware data register, and the firmware interface control unit returns the codes stored in the firmware data register back to the central processing unit via the system firmware transmission interface.

9. The storage device according to claim 8, wherein the storage module comprises a firmware region for storing the system firmware, and a data region.

10. The storage device according to claim 8, wherein the micro control unit comprises a control pin for transmitting the unfetch signal or the fetch-done signal to the central processing unit, the control pin and a reset pin of the central processing unit are coupled to an input end of a logic AND gate, and an output end of the logic AND gate is coupled to the central processing unit.

11. The storage device according to claim 8, wherein the interface control module further comprises a storage interface control unit coupled to the micro control unit and the central processing unit, after the central processing unit initializes the storage interface control unit by executing the system firmware, the central processing unit accesses the storage module via the storage interface control unit.

12. The storage device according to claim 11, wherein the system firmware comprises a boot block code and a runtime block code, the central processing unit reads the boot block code via the firmware interface control unit to initialize at least the storage interface control unit and a control chipset and a main memory of the motherboard, the central processing unit reads the runtime block code via the storage interface control unit to continue the booting procedure.

13. A booting method is adapted for booting a computer system, the computer system comprising a central processing unit, a controller, and a storage module, the controller coupled between the central processing unit and the storage module, the booting method comprising:
when power is supplied to the computer system, transmitting an unfetch signal to the central processing unit by the controller such that the central processing unit suspends a booting procedure;
loading a first code segment of a system firmware in the storage module into a buffer of the controller by the controller;
after the first code segment is fully loaded into the buffer, transmitting a fetch-done signal to the central processing unit by the controller such that the central processing unit starts executing the booting procedure; and
when the controller receives a read request transmitted from the central processing unit, the controller determines whether the address of the read request is within an address scope of the first code segment temporarily stored in the buffer, wherein when the address of the read request is within the address scope of the first code segment temporarily stored in the buffer, the controller reads the codes of the first code segment of the system firmware in the buffer according to the address of the read request, so as to return the codes to the central processing unit.

14. The booting method according to claim 13, further comprising performing a logic AND operation according to the fetch-done signal and a reset signal or the unfetch signal and the reset signal.

15. The booting method according to claim 13, wherein the system firmware includes a plurality of code segments, the first code segment being one of the plurality of code segments, and loading the first code segment of the system firmware in the storage module into the buffer of the controller by the controller comprises loading the first code segment into the buffer according to a first address carried in a first read request transmitted from the central processing unit.

16. The booting method according to claim 15, further comprising:
receiving a second read request from the central processing unit via the controller;
determining whether a second address carried in the second read request is within the first code segment; and
when the second address is not within the first code segment, loading a second code segment of the plurality of code segments corresponding to the second address into the buffer via the controller.

17. The booting method according to claim 15, wherein loading the first code segment of the system firmware in the storage module into the buffer of the controller comprises loading the first code segment of the system firmware in the storage module into the buffer via a peripheral control unit of the controller.

18. The booting method according to claim 15, wherein after transmitting the fetch-done signal to the central processing unit via the controller, the method further comprises reading the system firmware via a firmware interface control unit of the controller to execute the booting procedure so as to initialize at least a storage interface control unit of the controller, a control chipset and a main memory.

19. The booting method according to claim 18, wherein after initializing at least the storage interface control unit of the controller, a control chipset and a main memory, the method further comprises reading the system firmware via the storage interface control unit to continue the booting procedure.

* * * * *